Nov. 23, 1965     W. R. COOK, JR., ETAL     3,219,583

FERROELECTRIC CERAMIC AND TRANSDUCER EMBODYING SAME

Filed Jan. 16, 1963

INVENTORS
WILLIAM R. COOK, Jr.
& HANS JAFFE
BY
William J. Flynn
ATTORNEY

United States Patent Office 3,219,583
Patented Nov. 23, 1965

3,219,583
FERROELECTRIC CERAMIC AND TRANSDUCER
EMBODYING SAME
William R. Cook, Jr., and Hans Jaffe, Cleveland Heights,
Ohio, assignors to Clevite Corporation, a corporation
of Ohio
Filed Jan. 16, 1963, Ser. No. 251,829
9 Claims. (Cl. 252—62.9)

This invention relates to a ferroelectric ceramic suitable for use as the active element in an electromechanical transducer, and to a transducer embodying such a ceramic.

The ceramics to which the present invention pertains are polycrystalline aggregates fired to ceramic maturity and thereafter polarized, or capable of being polarized, to impart thereto electromechanical transducing properties similar to the well-known piezoelectric effect. Such ceramics may be embodied in transducers for producing, sensing and/or measuring sound, shock, vibration, pressures, and for various other applications, such as electromechanical wave filters.

A ceramic of principal importance for such applications is lead titanate zirconate, which is a polycrystalline material composed principally of $PbTiO_3$ and $PbZrO_3$ effectively in solid solution. Compositions of this general type and their properties are disclosed in U.S. Letters Patent No. 2,708,244 to Bernard Jaffe.

In addition to lead titanate zirconate, other ferroelectric ceramic materials of interest for various electromechanical transducer applications are lead titanate-lead stannate, and the ternary system lead titanate-lead ziramounts. For example, as disclosed in U.S. Letters Patent No. 2,849,404 to Jaffe, et al., in National Bureau of Standards Report No. 3684 (Jaffe Roth and Marzullo, Report No. 9, October 1, 1954), and in the article in Journal of Research of the National Bureau of Standards, vol. 55, No. 5, November 1955, pp. 239–254, entitled, "Properties of Piezoelectric Ceramics in the Solid-Solution Series Lead Titanate—Lead Zirconate—Lead Oxide: Tin Oxide and Lead Titanate—Lead Hafnate."

Certain properties of these ceramic materials have been improved by the addition of other elements in small amounts. For example, as disclosed in U.S. Letters Patent No. 3,006,857 to Kulcsar, the addition of a small amount of chromium or uranium to lead titanate zirconate greatly enhances the properties desired for electromechanical wave filter applications. As other examples, the addition of a small amount of strontium or calcium to lead titanate zirconate or lead titanate-lead stannate or lead titanate—lead zirconate—lead stannate increases its dielectric constant, as disclosed in United States Letters Patent No. 2,906,710 to Kulcsar and Jaffe, and a similar result is obtained by the addition of barium, as disclosed in the copending U.S. Patent application of Kulcsar and Jaffe, Serial No. 151,847, filed November 13, 1961, now Patent No. 3,144,411 and assigned to the same assignee as the present invention.

In the following description and claims, the constituents, lead, titanium, zirconium and tin, in oxidic form, of the compounds in FIG. 3 will be referred to as the "principal constituents" of the ferroelectric ceramic solid solution. The total quantity of such constituents greatly exceeds that of additions which may be provided as partial substituents for the principal constituents. One or more of the alkaline earth metals, strontium, calcium and barium, may be present in the ceramic as substituents for up to 30 atom percent of the lead in the ceramic. These possible alkaline earth substituents have the same valence as the lead replaced, and they will be referred to as "isovalent constituents." Both the "principal constituents" and the "isovalent constituents" are included under the general term "normal oxidic constituents."

In accordance with the present invention, the dielectric and mechanical losses of the ferroelectric ceramic are substantially reduced, and the ability of the ceramic to withstand de-poling is increased, by the partial substitution in the ceramic of at least one element having the following characteristics:

(1) A valence lower by one than that of one of the principal constituents of the ceramic;

(2) A position in a lower Group in the Periodic Table of Elements than said principal constituents; and (3) An ionic radius within ±7% of that of said principal constituent.

Because of the improved characteristics made possible by additions in accordance with the present invention, the ferroelectric ceramic material so produced is particularly advantageous for high power transducer applications.

It is the principal object of this invention to provide a novel and improved ferroelectric ceramic.

It is also an object of this invention to provide such a ceramic having relatively low dielectric and mechanical losses.

Another object of this invention is to provide such a ceramic which is better able to withstand de-poling.

Another object of this invention is to provide such a ceramic which is especially well adapted for high power transducer applications.

Also it is an object of this invention to provide an electromechanical transducer embodying such an improved ceramic.

Further objects and advantages of this invention will be apparent from the following detailed description of certain presently-preferred embodiments thereof, described with reference to the accompanying drawing.

Figure 1:
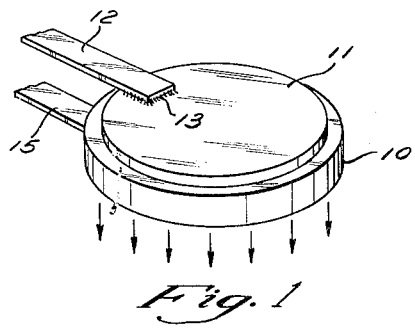
FIGURE 1 is a perspective view of an electromechanical transducer whose active element may consist of ferroelectric ceramic as described hereinafter.
Figure 2:
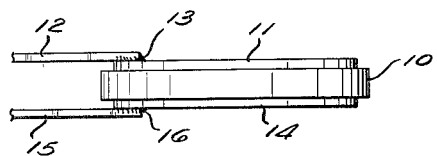
FIGURE 2 is an elevational view of the FIGURE 1 transducer.

Before proceeding with a description of the present invention, reference is made first to FIGURES 1 and 2 which illustrate an electromechanical transducer which may incorporate ceramic material produced in accordance with the present invention. In the particular embodiment shown, the transducer has as its active element a disc-shaped body 10 of the ceramic. The body 10, after being electrostatically polarized, is provided with a pair of electrodes 11 and 14 applied to its opposite major faces. Leads 12 and 15 are conductively attached by solder 13 and 16, respectively, to the electrodes 11 and 14. These leads may be used to connect the transducer in the electrical circuit (not shown) in which the transducer is to operate.

As is well understood, an electromechanical transducer, such as the particular device shown in FIGURES 1 and 2, converts applied electrical energy to mechanical energy, and vice versa. A voltage applied across the electrodes 11 and 14 produces a strain or mechanical deformation of the ceramic body 10. In the particular arrangement shown, the transducer is adapted to emit sound waves in the direction shown by the arrows in FIG. 1 into an appropriate external medium, which may be solid, liquid or gaseous. Conversely, if the ceramic body 10 is subjected to mechanical stress, the resulting strain generates an electrical output voltage across the electrodes 11 and 14.

The ceramic body 10 is a polycrystalline ceramic composed principally of a solid solution of lead titanate and either lead zirconate or lead stanate, or both. The body also may contain one or more other elements, termed "isovalent constituents," substituting in part for the lead of the lead titanate and zironate and/or stannate.

The basic compositions fall into three categories: (1) those belonging to the binary system lead titanate-lead zirconate; (2) those belonging to the binary system lead titanate-lead stannate; and (3) those belonging to the ternary system lead tianate-lead zirconate-lead stannate. The designations binary and ternary are used in conjunction with the base materials and in disregard of the additions, including isovalent constituents.

Furthermore, as will be appreciated by those conversant with the art, hafnium occurs as an impurity in varying amounts in zirconium; for the purposes of the invention, hafnium may be regarded as the substantial equivalent of zirconium and the presence of hafnium either as an impurity or as a substituent for zirconium is acceptable. However, because the high relative cost of hafnium as compared to zirconium renders its use uneconomic in commercial manufacture of the compositions under discussion, the present description will disregard the possible presence of hafnium.

Figure 3:
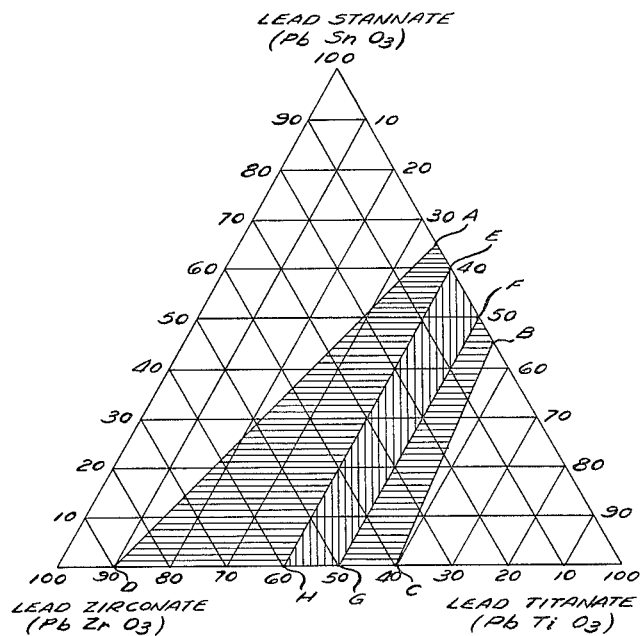
FIGURE 3 is a triangular compositional diagram of the principal constituents of the ceramic which is modified in accordance with the present invention.

All possible compositions coming within all three of the systems defined above are represented by the triangular diagram constituting FIGURE 3 of the drawings. All compositions represented by the diagram, however, are not ferroelectric, and many are electromechanically active only to a very slight degree. The present invention is concerned only with those compositions exhibiting piezoelectric response of appreciable magnitude. As a matter of convenience, the planar coupling, $k_p$ (also known as radial coupling, $k_r$, or disc coupling, $k_{disc}$), of test discs will be taken as a measure of piezoelectric activity. Thus, within the horizontally hatched area bounded by lines connecting points ABCD, FIGURE 3, all compositions polarized and tested showed a planar coupling of at least 10%. The area bounded by ABCD includes binary lead titanate-lead zirconate solid solutions lying on the line DC along which the mol ratio ($PbTiO_3:PbZrO_3$) of the end components varies from 10:90 to 60:40. Among these base line compositions those falling between points H and G have characteristically higher planar couplings with the highest couplings occurring where the

ratio is around 47:53 or 46:54 in the absence of additions.

The binary compositions on line AB ($PbTiO_3:PbSnO_3$ from 35:65 to 55:45) of the FIGURE 3 diagram are similar to those on line DC in structure but are characterized by generally lower planar couplings, with the best couplings occurring in compositions falling between points E and F, i.e., with the mol ratio $PbTiO_3:PbSnO_3$ in the range 40:60 to 50:50.

In the ternary compositions within the area designated ABCD, the inclusion of $PbSnO_3$ as a substituent for a portion of the $PbZrO_3$ in the base line compositions has the effect of progressively lowering the Curie temperature but the compositions retain a relatively high planar coupling, particularly in the area of the diagram bounded by lines connecting points EFGH.

In accordance with one embodiment of the present invention, scandium may be used as a partial substituent in the ceramic solid solution. Scandium has a valence lower by one than the valence (+4) of the principal constituent, zirconium. Scandium also has a position in the next lower Group (Group III) in the Periodic Table of Elements than zirconium (Group, IV). Moreover scandium has an ionic radius (0.83) which is within 7% of the ionic radius (0.87) of zirconium, according to "V. M. Goldschmidt, Skrifter Norske Videnskaps-Akad., Oslo, I. Mat.-Naturv. Klasse, 1926, No. 2."

As one example, 2 atom percent scandium was substituted in lead titanate zirconate having the basic formula $Pb(Ti_{.47}Zr_{.53})O_3$ prior to such substitution. The scandium addition was made by combining lead oxide (PbO), zirconia ($ZrO_2$), titania ($TiO_2$) and scandium oxide ($Sc_2O_3$), and wet (or dry) milling these starting materials to achieve thorough mixing and reduction of particle size. After the first milling, the mixture was dried and reground briefly to assure as homogenous mixture as possible. Thereafter, the mixture, either loose or suitably formed into a desired shape, was reaction-fired at a temperature of about 875° C. for a period of about 2 hours. After the reacted material had cooled, it was then crushed and milled to a small particle size. Thereafter, it was formed into the desired shape and was subjected to maturing firing at a temperature of about 1350° C. for a period of about 45 minutes.

The fired ceramic body was polarized in the usual way, such as by applying the electrodes 11 and 14 in FIGURES 1 and 2 to its opposite major faces and applying an electrostatic field across the electrodes. The poling field was 40 kv./cm. at a temperature of 105° C. for four minutes.

The finished ceramic body had the following values after poling:

| | |
|---|---|
| K | 470 |
| D | .0029 |
| $k_p$ | .392 |
| $Q_m$ | 1,090 |

By comparison, the same lead titanate zirconate (with a 47:53 mol ratio of titanate to zirconate) in the absence of such addition of scandium had the following values after poling:

| | |
|---|---|
| K | 628 |
| D | .0051 |
| $k_p$ | .541 |
| $Q_m$ | 404 |

The various constants and coefficients in the tables are defined as follows:

K=relative dielectric constant, or permittivity of the material relative to the permittivity of space;

D=electric dissipation factor;

$k_p$=planar piezoelectric coupling coefficient, also known as radial coupling or disc coupling;

$Q_m$=mechanical Q, a constant times the ratio of mechanical energy stored per cycle to mechanical energy dissipated per cycle.

For methods of measurement, reference can be made to "IRE Standards on Piezoelectric Crystals: Measurements of Piezoelectric Ceramics, 1961," published in "Proceedings of the IRE," vol. 49, No. 7, July 1961.

The following table shows the values obtained by the addition of 2 atom percent scandium, using the technique described above, to lead titanate zirconate having different zirconate/titanate mol ratios, as indicated:

| Ti:Zr | K | D | $k_p$ | $Q_m$ |
|---|---|---|---|---|
| 49:51 | 554 | .0027 | .416 | 1,092 |
| 48:52 | 524 | .0028 | .399 | 1,149 |
| 46:54 | 464 | .0030 | .384 | 1,040 |
| 45:55 | 440 | .0030 | .338 | 1,179 |

From the foregoing, it will be evident that the partial substitution of scandium in the ceramic solid solution produces a substantial increase in the mechanical Q and a substantial decrease in the electric dissipation factor, D, both of which factors are advantageous for certain practical applications of the ceramic, particularly as the active element in transducers for high power applications.

In accordance with another embodiment of this invention, indium may be used as a partial substituent in the ceramic. Indium has a valence lower by one than the valence (+4) of the principal constituent zirconium, a position in the next lower Group (Group III) in the Periodic Table than zirconium (Group IV), and an ionic radius (0.92) within 7% of that of zirconium, according to the Goldschmidt reference cited above.

As an example of this embodiment of the present invention, indium in oxide form was added to lead titanate zirconate, following substantially the same technique as described for scandium. In one particular instance, 2 atom percent indium was substituted in lead titanate zirconate having the basic formula $Pb(Ti_{.47}Zr_{.53})O_3$ before such substitution. The measured values for this indium-modified material after polling were as follows:

```
K _____ 705
D _____ .0036
kp _____ .328
Qm _____ 854
```

The partial substitution of indium in the ceramic substantially increased the $Q_m$ and substantially decreased the dissipation factor, D, as will be evident by comparison with the values given above for unmodified

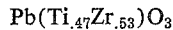
$$Pb(Ti_{.47}Zr_{.53})O_3$$

In accordance with still another embodiment of this invention, potassium may be used as a partial substituent in the ceramic. Potassium has a valence (+1) which is lower by one than the valence (+2) which the principal constituent, lead, has in the ceramic solid solutions represented by the phase diagram of FIG. 3. Also, potassium has a position in a lower Group (Group I) in the Periodic Table than lead (Group II), and potassium has an ionic radius (1.33) which is with 7% of the ionic radius (1.32) of lead, according to the Goldschmidt reference already cited.

As an example of this embodiment of the present invention, potassium carbonate may be added to the starting materials (described above) for lead titanate zirconate. $CO_2$ is given off during the reaction firing, leaving the oxide of the addition element, potassium. In other respects, the process of preparing the ceramic and firing it to maturity is essentially similar to the process described above for scandium as the addition element.

The following table shows the results, after poling, obtained by the addition of specific amounts of potassium to lead titanate zirconate having specified mol ratios of Ti to Zr:

| Addition | Ti:Zr | K | D | $k_p$ | $Q_m$ |
|---|---|---|---|---|---|
| 1 atom percent K | 49:51 | 838 | .0031 | .474 | 1,018 |
| Do | 47:53 | 645 | .0040 | .483 | 728 |

In the example above where 1 atom percent of potassium was added to 49:51 lead titanate zirconate, poling was done at 40 kv./cm. at 105° C. for 4 minutes.

In the example above where 1 atom percent of potassium was added to 47:53 lead titanate zirconate, poling was done at 20 kv./cm. at 105° for 4 minutes.

From the above table, it will be evident that the partial substitution of potassium in the ceramic produced a substantial increase in $Q_m$ and a substantial decrease in the dissipation factor, D, as in the other embodiments of this invention.

Although each of the specific examples given has only the principal constituents, lead, titanium and zirconium, as the normal oxidic constituents of the ceramic, it is to be understood that the invention is applicable also to ceramics in which tin is present as a principal constituent and to ceramics in which one or more isovalent constituents, such as strontium, calcium and barium, are present also (in addition to the principal constituents) as part of the normal oxidic constituents of the ceramic.

While certain illustrative examples of the present invention have been described in detail, it is to be understood that the invention is susceptible of other embodiments without departing from the principles and scope of this invention. For example, the percentage amounts of the additions may differ from the specific examples given.

We claim:

1. A ferroelectric ceramic composition consisting essentially of a material selected from the area ABCD of FIGURE 3 and containing at least one element selected from the group consisting of potassium, scandium and indium in an amount sufficient to increase the ability of the ceramic to withstand depoling, decrease the dielectric losses of the ceramic, and increase the mechanical Q to thereby decrease the mechanical losses of the ceramic.

2. A ferroelectric ceramic composition as claimed in claim 1 wherein from 0 to 30 atom percent of the lead is replaced by at least one element selected from the group consisting of strontium, calcium and barium.

3. A ferroelectric ceramic composition consisting essentially of a solid solution of lead zirconate lead titanate selected from the line GH of FIGURE 3 and containing at least one element selected from the group consisting of potassium, scandium and indium in an amount sufficient to increase the ability of the ceramic to withstand depoling, decrease the dielectric losses of the ceramic, and increase the mechanical Q to thereby decrease the mechanical losses of the ceramic.

4. A ferroelectric ceramic composition as claimed in claim 3 wherein from 0 to 30 atom percent of the lead is replaced by at least one element selected from the group consisting of strontium, calcium and barium.

5. An electromechanical transducer comprising an electrically polarized ceramic body, consisting essentially of lead zirconate lead titanate ceramic material selected from the area ABCD of FIGURE 3 and containing at least one element selected from the group consisting of potassium, scandium and indium in an amount sufficient to increase the ability of the ceramic to withstand depoling, decrease the dielectric losses of the ceramic, and increase the mechanical Q to thereby decrease the mechanical losses of the ceramic.

6. An electromechanical transducer comprising an electrically polarized ceramic body, consisting essentially of lead zirconate lead titanate ceramic material selected from the line CD of FIGURE 3 and containing at least one element selected from the group consisting of potassium, scandium and indium in an amount sufficient to increase the ability of the ceramic to withstand depoling, decrease the dielectric losses of the ceramic, and increase the mechanical Q to thereby decrease the mechanical losses of the ceramic.

7. An electromechanical transducer as claimed in claim 6 wherein said ceramic body also contains at least one alkaline earth metal selected from the group consisting of strontium, calcium and barium as a substitute for from 0 to 30 atom percent of the lead.

8. An electromechanical transducer comprising an electrically polarized ceramic body, consisting essentially of lead zirconate lead titanate material selected from the line GH of FIGURE 3 and containing at least one element selected from the group consisting of scandium, potassium and indium in an amount sufficient to increase the ability of the ceramic to withstand depoling, decrease the dielectric losses of the ceramic, and increase the mechanical Q to thereby decrease the mechanical losses of the ceramic.

9. An electromechanical transducer as claimed in claim 8 wherein said ceramic body also contains at least one alkaline earth metal selected from the group consisting of strontium, calcium and barium as a substitute for from 0 to 30 atom percent of the lead.

References Cited by the Examiner

UNITED STATES PATENTS

| | | | |
|---|---|---|---|
| 2,906,710 | 9/1959 | Kulscar et al. | 252—62.9 |
| 2,911,370 | 11/1959 | Kulscar | 252—62.9 |

FOREIGN PATENTS 553,129  6/1957  Belgium.

TOBIAS E. LEVOW, *Primary Examiner.*

MAURICE A. BRINDISI, *Examiner.*

UNITED STATES PATENT OFFICE
CERTIFICATE OF CORRECTION

Patent No. 3,219,583                                November 23, 1965

William R. Cook, Jr., et al.

It is hereby certified that error appears in the above numbered patent requiring correction and that the said Letters Patent should read as corrected below.

Column 1, line 32, for "amounts. For example," read -- conate-lead stannate, --; column 3, line 26, for "tianate-lead" read -- titanate-lead --; column 5, line 34, for "polling" read -- poling --; column 6, line 6, for "105°" read -- 105° C. --.

Signed and sealed this 11th day of October 1966.

(SEAL)
Attest:

ERNEST W. SWIDER                                EDWARD J. BRENNER
Attesting Officer                                      Commissioner of Patents